United States Patent
Chambers et al.

(10) Patent No.: US 6,265,468 B1
(45) Date of Patent: Jul. 24, 2001

(54) AQUEOUS POLYURETHANE DISPERSIONS AND COATINGS PREPARED THEREFROM

(75) Inventors: Douglas Ronald Chambers, Hunterville; Mario Pschaidt, Charlotte; Allen T. Slocki, Charlotte; David LeBlanc, Charlotte; Tanya T. Ward, Mt. Holly; Brian S. Carpenter, Stanly, all of NC (US)

(73) Assignee: Vianova Resins, Inc., Charlotte, NC (US)

( * ) Notice: Subject to any disclaimer, the term of this patent is extended or adjusted under 35 U.S.C. 154(b) by 0 days.

(21) Appl. No.: 09/355,449

(22) PCT Filed: Oct. 22, 1998

(86) PCT No.: PCT/EP98/06710

§ 371 Date: Mar. 7, 2000

§ 102(e) Date: Mar. 7, 2000

(87) PCT Pub. No.: WO99/21904

PCT Pub. Date: May 6, 1999

(51) Int. Cl.[7] .............................. C08K 3/20; C08L 63/02
(52) U.S. Cl. ......................... 523/415; 524/840; 524/841
(58) Field of Search .............................. 523/415; 524/840, 524/841

(56) References Cited

U.S. PATENT DOCUMENTS

| | | |
|---|---|---|
| 4,098,933 | 7/1978 | Burkhardt et al. . |
| 4,608,413 | 8/1986 | Nachtkamp et al. . |
| 4,925,885 * | 5/1990 | Rosthauser et al. ................. 523/415 |
| 5,308,914 | 5/1994 | Wallon et al. . |
| 5,739,216 * | 4/1998 | Duecoffre et al. ................... 528/438 |

FOREIGN PATENT DOCUMENTS 0 324 370 A1   7/1989   (EP) .

* cited by examiner

Primary Examiner—Robert Dawson
Assistant Examiner—D. Aylward
(74) Attorney, Agent, or Firm—Frommer Lawrence & Haug LLP

(57) ABSTRACT

The present invention is directed to two- and three- component aqueous polyurethane composition which are cured at ambient temperature and have excellent chemical resistance without reduction in abrasion resistance and flexibility. The two component system comprises a first component of a hydroxy functional aqueous polyurethane dispersion and phenoxy resin blended together, and a second component of polyisocyanate. The three component system comprises a first component of a hydroxy functional aqueous polyurethane dispersion, a second component of epoxy resin; and a third component of polyisocyanate. Generally, the mass of the epoxy or phenoxy resins is 1 to 50% of mass of the polyurethane solids in the dispersion and the mass of the polyisocyanate is 50 to 200% of the mass of the polyurethane solids in the dispersion. The two or three component polyurethane composition has a mass fraction of solids of preferably 10–50%.

21 Claims, No Drawings

AQUEOUS POLYURETHANE DISPERSIONS AND COATINGS PREPARED THEREFROM

BACKGROUND OF THE INVENTION

1). Field of the Invention

The present invention relates to two- and three- component aqueous polyurethane dispersions which are cured at ambient temperatures and to the coatings prepared therefrom which have excellent chemical resistance without reduction in abrasion resistance and flexibility. More particularly, the present invention relates to a coating composition comprised of a hydroxy functional aliphatic polyurethane dispersion in water combined with an aromatic polyether and crosslinked with an aliphatic or aromatic polyisocyanate compound. More specifically the aromatic polyether can be an epoxy resin or a phenoxy resin.

2) Prior Art Description

Aqueous polyurethane dispersions and their use for the production of coatings are known. The dispersions may be cured at ambient temperature by evaporation of water and coalescence of the individual polyurethane particles. These water-based products have been developed in an effort to reduce the amount of organic solvents which are present in corresponding solvent-based coating compositions. Even though the prior art dispersions possess many valuable properties, it has not been possible to obtain coatings which possess all of the properties of coatings obtained from solvent-based coating compositions, especially with regard to hardness and solvent resistance.

The known aqueous polyurethane dispersions do not possess the amount of crosslinking which is required to obtain these properties. One method of increasing the amount of crosslinking is to blend the polyurethane dispersion with a water dispersible, blocked polyisocyanate as disclosed in U.S. Pat. No. 4,098,933. U.S. Pat. No. 4,608,413 discloses the use of water dispersible, blocked polyisocyanates in combination with polyurethanes which contain hydroxyl groups as crosslinking sites. While the systems disclosed in these patents make it possible to obtain improved hardness and crosslinking, they suffer from the disadvantage that the coating compositions must be heated to high temperatures in order to release the blocking agent and initiate crosslinking. Obviously, these coating compositions are not suitable for application to substrates which cannot withstand the unblocking temperature of the polyisocyanate.

Accordingly, it is an object of the present invention to provide aqueous polyurethane dispersions which may be cured at ambient temperature to provide coatings with excellent hardness, flexibility, solvent resistance and surface appearance.

SUMMARY OF THE INVENTION

The present invention relates to a two- or three-component aqueous polyurethane dispersion useful as a coating composition which is cured at ambient temperature and contains:

i) a hydroxy functional aliphatic polyurethane dispersion in water;

ii) a crosslinker selected from the group consisting of aliphatic or aromatic polyisocyanate compounds; and iii) an aromatic polyether selected from the group consisting of epoxy resins and phenoxy resins, or mixtures thereof.

More specifically, the polyurethane of component i) is a hydroxyl group containing polyurethane obtainable by two-step reaction of a polyisocyanate A having at least two isocyanate groups, a polyol B having a $M_n$ of at least 400 g/mol, selected from the group consisting of polyester polyols, polyether polyols, polyurethane polyols, and polyacrylate polyols, with a hydroxyl number of from 30 to 280 mg/g, a compound C that has at least one group capable of forming anions, and at least two groups that are reactive towards isocyanate groups, and optionally, a low molar mass polyol D with $M_n$ of from 60 to 400 g/mol to form an isocyanate-terminated intermediate, which is then reacted with at least one of a low molar mass polyol E carrying no other isocyanate-reactive group, a compound F which is either monofunctional towards NCO or contains active hydrogen of different reactivity, a compound G selected from the group consisting of water, hydrazine and aliphatic diprimary amines like ethylene diamine, diamino propane and diamino hexane, with an OH number of from 30 to 200 mg/g and $M_n$ of from 1600 to 50000 g/mol.

When an epoxy resin is employed as the aromatic polyether, the coating compositions of the present invention are generally three-component systems as set forth in i)–iii) above. When the aromatic polyether is a phenoxy resin, the phenoxy resin is generally blended with the polyurethane dispersion, so that a two-component system (the polyurethane/phenoxy component and the crosslinker polyisocyanate component) results.

The present invention also relates to a cured coating which comprises the dried film (dried residue) of a uniformly mixed and reacted composition comprising:

i) a hydroxy functional aliphatic polyurethane dispersion as described supra;

ii) an aliphatic or aromatic polyisocyanate; and iii) either an epoxy resin or a phenoxy resin.

The disclosed invention is an improvement over conventional water based polyurethanes which are crosslinked with polyisocyanate in that the chemical resistance is greatly improved by the addition of the aromatic polyether compound but no reduction in flexibility is seen. The increase of the chemical resistance is due to the polyether of the invention and it was discovered that maintaining the same flexibility and abrasion resistance as a non-aromatic polyether system was unexpected and unique. The coating composition may further comprise solvents, in a mass fraction of from 1 to 20 per cent of the sum masses of components i), ii) and iii).

The applications for this invention are in floor coatings, anti-graffiti coatings, general metal coatings, and aerospace coatings, but these uses are not exhaustive.

DESCRIPTION OF THE PREFERRED EMBODIMENTS

Suitable hydroxy functional aliphatic polyurethane dispersions i) are obtainable by two-step reaction of a polyisocyanate A having at least two isocyanate groups,
a polyol B having a $M_n$ of at least 400 g/mol, selected from the group consisting of polyester polyols, polyether polyols, polyurethane polyols, and polyacrylate polyols, with a hydroxyl number of from 30 to 280 mg/g,
a compound C that has at least one group capable of forming anions, and at least two groups that are reactive towards isocyanate groups, and optionally,
a low molar mass polyol D with $M_n$ of from 60 to 400 g/mol to form an isocyanate-terminated intermediate, which is then reacted with at least one of
  a low molecular mass polyol E carrying no other isocyanate-reactive group,
  a compound F which is either monofunctional towards NCO or contains active hydrogen of different reactivity,
  a compound G selected from the group consisting of water, hydrazine and aliphatic diprimary amines like ethylene diamine, diamino propane and diamino hexane, with an OH number of from 30 to 200 mg/g and $M_n$ of from 1600 to 50000 g/mol.

Suitable polyisocyanates A (which means compounds having a plurality of isocyanate groups) for preparing the hydroxy functional polyurethane include any organic polyisocyanate, preferably monomeric diisocyanates. Especially preferred are polyisocyanates, especially diisocyanates, having aliphatically- and/or cycloaliphatically-bound isocyanate groups, although polyisocyanates having aromatically-bound isocyanate groups are not excluded and may also be used.

Examples of suitable polyisocyanates which may be used include ethylene diisocyanate, 1,4-tetramethylene diisocyanate, 1,6-hexamethylene diisocyanate, 2,4,4-trimethyl-1,6-hexamethylene diisocyanate, 1,12-dodecane diisocyanate, cyclobutane-1,3-diisocyanate, cyclohexane-1,3- and/or -1,4-d iisocyanate, 1-isocyanato-2-isocyanatomethyl cyclopentane, 1-isocyanato-3,3,5-trimethyl-5-isocyanatomethyl cyclohexane(isophorone diisocyanate or IPDI), 2,4- and/or 2,6-hexahydrotoluylene diisocyanate, 2,4'- and/or 4,4'-dicyclohexylmethane diisocyanate, α,α,α',α-tetramethyl-1,3- and/or -1,4-xylylene diisocyanate, 1,3- and 1,4-xylylene diisocyanate, 1-isocyanato-1-methyl-4(3)-isocyanatomethyl-cyclohexane, 1,3- and 1,4-phenylene diisocyanate, 2,4- and/or 2,6-toluylene diisocyanate, diphenyl methane-2,4'- and/or -4,4'-diisocyanate, naphthalene-1,5-diisocyanate, triphenyl methane-4,4',4''-triisocyanate, polyphenyl polymethylene polyisocyanates of the type obtained by condensing aniline with formaldehyde followed by phosgenation, and mixtures of the above-mentioned polyisocyanates.

The polyisocyanates A are preferably the so-called "paint polyisocyanates" which are uncapped and have low vapour pressure, and can therefore be used in paint applications; examples of these paint polyisocyanates including dimers of polyisocyanates (uretdiones), trimers (isocyanurates), or reaction products with glycols or polyols, amines or phenols. These "paint polyisocyanates" are also preferably used as component ii) of the coating composition. Preferably, the polyisocyanates used as component ii) are not in any way hydrophilically modified, as can be effected by incorporation of polyethylene glycol segments, or anionic or potentially anionic groups by processes known in the art. The mass of the polyisocyanate ii) employed in the present invention is from about 50 to about 200% of the mass of the polyurethane solids, but preferably from 90 to 160% of that mass. Any suitable solvent which does not react with isocyamate groups may be added to the polyisocyanate to reduce their viscosity. Especially preferred are ethylene or propylene glycol ethers and ether acetates, like ethylene glycol monomethyl ether acetate, or propylene glycol methyl ether acetate. Such glycol ethers and ether acetates are commercially available under the trade name of "® Dowanol".

The polyols B preferably have a number average molar mass $M_n$ of from 400 to 5000 g/mol. Their hydroxyl number, as defined infra, is in general from about 30 to about 300 mg/g. Examples of suitable polyols include polyether polyols such as polyoxyethylene glycol, polyoxypropylene glycol, or mixed polymers of such units, polyester polyols obtainable by polycondensation of diols or polyols with dicarboxylic or polycarboxylic acids, such polyester polyols including polyethylene adipate, mixed polyesters derived from ethylene glycol, hexane diol, trimethylol propane, adipic and terephthalic acid, etc. Other building blocks that may constitute, or be included in, such polyester polyols are hydroxycarboxylic acids such as hydroxybutyric or hydroxycaproic acid or their lactones.

The low molar mass polyols C with a molar mass of preferably from about 60 to about 400 g/mol, include ethylene glycol, diethylene glycol, 1,4-butane diol, cyclohexane diol, etc. Compounds D include polyols, particularly diols, and polyamines, particularly diamines, or hydroxyamines, that carry also from 1 to 3 carboxyl or sulfonic acid groups per molecule. The mass fraction of compounds D in the sum of masses of all monomers of the polyurethane ranges from 2 to 20 %.

Compounds E which are employed in a stoichiometric excess of number of functional groups to number of isocyanate groups in the prepolymer are polyols having at least three hydroxyl groups (the excess chosen such that one hydroxyl group reacts with the isocyanate, leaving at least two hydroxyl groups of E unreacted). Compounds F are preferably selected from monosecondary amines and monoalcohols, which may further contain tertiary amino groups, examples being diethylamine, dipropyl amine, morpholine, N-methyl piperidine, and dimethylaminoethanol amine, and from compounds with active hydrogen of different reactivity, diethanolamine being especially preferred. Compounds G, the so-called chain extenders, are preferably difunctional, and include water, diprimary amines like ethylene diamine, diamino propane and diamino hexane, and hydrazine.

Suitable polyurethane dispersions have hydroxyl numbers from 20 to about 100 mg/g, and preferably from 40 to 70 mg/g. The hydroxyl number or OH number is defined according to DIN 53 240 as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

Suitable solvents are esters, ketones, halogenated hydrocarbons, alkanes and arenes, or mixtures of two or more of these. Preferably the solvent of the present invention is water-miscible, and is a glycol ether or a glycol ether acetate, especially preferred is propylene glycol methyl ether acetate.

Suitable aromatic polyethers iii) are epoxy resins or phenoxy resins, or mixtures thereof. Epoxy resins are well known in the art. They can be prepared by the so-called advancement reaction, which is reaction of bis-glycidyl ethers with diphenols, or the so-called Taffy process where diphenols are directly reacted with epichlorohydrin. They are characterised by their content of free epoxy groups, which can be used in a large variety of curing reactions. Phenoxy resins are essentially linear mixed aromatic-aliphatic polyethers, comprising repeating units derived from glycidyl alcohol, and repeating units derived from dihydroxy aromatics. They have terminal hydroxyl groups, and also secondary hydroxyl groups in the repeating units derived from the glycidyl alcohol. In most cases, bisphenol A is used as dihydroxy aromatic compound.

The mass of aromatic polyether employed in the present invention is from about 1 to about 50% of the mass of the polyurethane solids, but preferably from 10 to 30% of that mass. These polyethers have a (weight-average) molar mass $M_n$ of about 200 to about 40,000 g/mol; but preferably from 1,000 to 30,000 g/mol.

The polyisocyanate ii) should not be blended with the hydroxy functional polyurethane polyether blend until it is time to apply the coating composition to a suitable substrate. As with two component, solvent based coating compositions, the mixture of the coreactants has a limited useful potlife, which is dependent upon the reactivity of the coreactants, ratios of coreactants and catalysts present in the system. When it is desired to blend the two components, the polyisocyanate may simply be added to the water dispersible, hydroxy functional polyurethane or vice versa with vigorous stirring. Methods for blending the two components are known in the art.

After the components have been blended the coating composition should have a mass fraction of solids in the composition of about 2 to 80%, preferably about 10 to 50%. A mass fraction $w_B$ of a component B in a mixture is the ratio of the mass $m_B$ of component B and the mass m of the mixture.

The aqueous coating compositions according to the present invention may be applied to substrates using any of the various techniques known in the art. In addition, the aqueous compositions may be blended with other types of resins optionally containing isocyanate-reactive groups or with amine- or phenol-formaldehyde condensates known in the art. They can also contain pigments, leveling agents, catalysts, and other auxiliaries known in the art. Examples of the application techniques, resins and auxiliaries are set forth in U.S. Pat. No. 4,408,008, which is herein incorporated by reference.

GENERAL DESCRIPTION OF THE EXAMPLES

Various dispersions are made, with and without the epoxy or phenoxy resins, and coated as described later. Each dispersion is coated on steel panel substrates, cured (dried) for seven (7) days and tested for gloss, hardness, impact resistance and a variety of chemicals to ascertain chemical resistance. All tests are ASTM standards and set forth in the following examples.

The polyisocyanate, a hexamethylene diisocyanate, employed was/is commercially available from Bayer Chemical Co. under the name Desmodur N-3300 containing 100% solids. The polyisocyanate was mixed with various levels of a solvent—commercially available from Dow Chemical Co. under the name of ®Dowanol PM Acetate Solvent.

Several different types of polyurethane were employed in the examples. Each type had a mass fraction of solids and was easily miscible with water. The two types of polyurethane employed were ®Daotan VTW 1225 and ®Daotan VTW 1270 commercially available from Vianova Resins, Germany. These polyurethanes are made from polyesterpolyol, aromatic isocyanate, and dimethylol propioric acid in the first step, the isocyanate functional prepolymer is then reacted with aminoalcohol or polyol, respectively, to introduce terminal hydroxyl groups, and then neutralised with amine and dispersed in water.

The amount of water added to the various dispersions was to keep the solids level constant for all dispersions so as not to influence the various tests performed on the coatings.

The epoxy resins employed in the examples are all dispersion of solid epoxy resins in water, they were commercially available from Vianova Resins in Mainz-Kastel, Germany under the names:

| ® Beckopox EP 384w having a solids content of 53% (mass fraction) | |
| --- | --- |
| EP 385w | 56% |
| VEM 2132w | 55% |
| VEM 2137 w/55 | 55% |

The phenoxy resin employed in the examples was commercially available from Phenoxy Associates located in Rock Hill, S.C. under the name PKHW-34 having 34% solids. This is a resin comprising moieties derived from bisphenol A and from glycerol. In the mechanical tests, impact resistance is measured in "in-lbs" as laid down in ASTM G 14-88. To convert to the SI unit "J" (Joule), multiply by 0,11303. "Gms" stands for "grams".

EXAMPLES

Comparative Example 1

To a liter vessel the following is added under gentle stirring.

| | |
| --- | --- |
| 473.0 grams | Daotan VTW 1225 Aqueous polyurethane |
| 73.5 grams | Water |
| 34.7 grams | ®Dowanol PM Acetate Solvent (Dow Chemical Company) |

This mixture is set aside and labeled Component A To another 1 liter agitated vessel the following is added:

| | | |
|---|---|---|
| 237.4 grams | ®Desmondur N-3300 (aliphatic polyisocyanate, Bayer Chemical Co.) | |
| 70.3 grams | PM Acetate Solvent (Dow Chemical Company) | |

This mixture is set aside and labeled Component B

The above components were allowed to sit overnight for equilibration and were then combined by adding Component A to Component B under high speed mixing known to those skilled in the art. The above mixed components were allowed to sit for 30 minutes to release any entrained air and were then drawn down with a 5 mil drawdown bar on steel panels for testing (Q Panel Corporation). 4"×4" Taber abraser panels were also coated with a paint brush for the testing of abrasion resistance. The coated panels are allowed to cure for 7 days at room temperature and were then tested for several properties. The results obtained by this example are shown in the following table:

| Test | Result | ASTM Reference |
|---|---|---|
| Gloss (60° Specular) | 105.9 | D 523 |
| Pencil Hardness | 5H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 50 milligrams loss | D 4060 |
| Chemical Resistance (24 hours covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | Severe Softening | D 1308-87 |
| Saturated Sugar Solution | No Effect | D 1308-87 |
| Saturated Salt Solution | No Effect | D 1308-87 |
| Methanol | Softening | D 1308-87 |
| Butanol | Softening | D 1308-87 |
| Mineral Spirits | No Effect | D 1308-87 |
| Gasoline | Softening | D 1308-87 |
| Xylene | Softening | D 1308-87 |
| Motor Oil | No Effect | D 1308-87 |
| Clorox | No Effect | D 1308-87 |

Comparative Example 2

The same technique used to prepare Example 1 was used but instead of Daotan VTW 1225 a substitution of Daotan VTW 1270 was made. The components of this formulation were also mixed according to the method use in Example 1 and the films where cast in the same manner. The data for this example is as follows:

| Test | Result | ASTM Reference |
|---|---|---|
| Gloss (60° Specular) | 96.1 | D 523 |
| Pencil Hardness | 5H | D 3363 |
| Direct Impact Resistance | >160 in · lbs | G 14-88 |

-continued

| Test | Result | ASTM Reference |
|---|---|---|
| Indirect Impact Resistance | >160 in · lbs | G 14-88 |
| Abrasion Resistance (CS-17 Disk, 1000 gms, 1000 cycles) | 50 milligrams loss | D 4060 |
| Chemical Resistance (24 hour covered spot test) | | |
| 10% Hydrochloric Acid | Film Destroyed | D 1308-87 |
| 25% Nitric Acid | Film Destroyed | D 1308-87 |
| 10% Sulfuric Acid | Film Destroyed | D 1308-87 |
| 10% Ammonia | Film Destroyed | D 1308-87 |
| Saturated Sugar Solution | 8D Blisters | D 1308-87 |
| Saturated Salt Solution | No Effect | D 1308-87 |
| Methanol | 8D Blisters | D 1308-87 |
| Butanol | Film Destroyed | D 1308-87 |
| Mineral Spirits | No Effect | D 1308-87 |
| Gasoline | Severe Softening | D 1308-87 |
| Xylene | Severe Softening | D 1308-87 |
| Motor Oil | No Effect | D 1308-87 |
| Clorox | Severe Softening | D 1308-87 |

Example 3

This example was to demonstrate how the partial substitution (10%) of epoxy resin for some of the urethane component increased the chemical resistance of the formulation.

To a liter vessel the following was added under gentle stirring.

| | |
|---|---|
| 424.75 grams | Daotan VTW 1225 |
| 85.03 grams | Water |
| 34.7 grams | PM Acetate Solvent (Dow Chemical Company) |

This mixture was set aside and labeled Component A.

A 35.53 gram sample of Beckopox EP 384w/53% epoxy dispersion was put in a separate container and labeled as Component B.

To another 1 liter agitated vessel the following was added:

| | |
|---|---|
| 237.4 grams | Desmondur N-3300 (Aliphatic polyisocyanate, Bayer Chemical Co.) |
| 70.3 grams | PM Acetate Solvent (Dow Chemical Company) |

This mixture was set aside and labeled Component C.

The above components were allowed to sit overnight for equilibration and were then combined by adding Component A to Component B under high speed mixing, then after 5 minutes Component C was added and mixed for an additional 5 minutes. The above mixed components were allowed to sit for 30 minutes to release any entrained air and were then drawn down with a 5 mil drawdown bar on steel panels for testing (Q Panel Corporation). 4"·4" Taber abraser panels were also coated with a paint brush for the testing of abrasion resistance. The coated panels were allowed to cure for 7 days at room temperature and were then tested for several properties. The results obtained by this example are shown in the following table:

| Test | Result | ASTM Reference |
|---|---|---|
| Gloss (60° Specular) | 105.9 | D 523 |
| Pencil Hardness | 4H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 50 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | 4 F Blisters | D 1308-87 |
| 10% Ammonia | No Effect | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the chemical resistance of the example was improved significantly by substitution of 10% epoxy solids for 10% of the polyurethane solids in Example 1 with no other sacrifice in either flexibility or abrasion resistance.

Example 4

This example was to again demonstrate how the partial substitution (20%) of epoxy resin for some of the urethane component increased the chemical resistance of the formulation.

To a liter vessel the following was added under gentle stirring.

| 377.19 grams | Daotan VTW 1225 |
|---|---|
| 96.49 grams | Water |
| 34.7 grams | PM Acetate Solvent (Dow Chemical Company) |

This mixture was set aside and labeled Component A

A 71.37 gram sample of Beckopox EP 384w/53% epoxy dispersion was put in a separate container and labeled as Component B.

To another 1 liter agitated vessel the following was added:

| 237.4 grams | Desmondur N-3300 (Aliphatic polyisocyanate, Bayer Chemical Co.) |
|---|---|
| 70.3 grams | PM Acetate Solvent (Dow Chemical Company) |

This mixture was set aside and labeled Component C.

The above components were allowed to sit overnight for equilibration and were then combined by adding Component A to Component B under high speed mixing, then after 5 minutes Component C was added and mixed for an additional 5 minutes. The above mixed components were allowed to sit for 30 minutes to release any entrained air and were then drawn down with a 5 mil drawdown bar on steel panels for testing (Q Panel Corporation). 4"·4" Taber abraser panels were also coated with a paint brush for the testing of abrasion resistance. The coated panels were allowed to cure for 7 days at room temperature and were then tested for several properties. The results obtained by this example are shown in the following table:

| Test | Result | ASTM Reference |
|---|---|---|
| Gloss (60° Specular) | 92 | D 523 |
| pencil Hardness | 6H | D 3363 |
| Direct Impact Resistance | >160 in · lbs | G 14-88 |
| Indirect Impact Resistance | >160 in · lbs | G 14-88 |
| Abrasion Resistance (24 hour covered spot test) | 50 milligrams loss | D 4060 |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | 8 F Blisters | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the chemical resistance of the example was improved significantly by substitution of 20% Epoxy solids for 20% of the Urethane solids in Example 1 with no other sacrifice of properties in either flexibility or abrasion resistance.

Example 5

This example was to again demonstrate how the partial substitution (20%) of epoxy resin for some of the urethane component increases the chemical resistance of the formulation.

To a 1 liter vessel the following was added under gentle stirring.

| 377.19 grams | Daotan VTW 1270 |
|---|---|
| 96.49 grams | Water |
| 34.7 grams | PM Acetate Solvent (Dow Chemical Company) |

This mixture was set aside and labeled Component A.

A 71.37 gram sample of Beckopox EP 384w/53% epoxy dispersion was put in a separate container and labeled as Component B.

To another 1 liter agitated vessel the following was added:

| 237.4 grams | Desmondur N-3300 (Aliphatic polyisocyanate, Bayer Chemical Co.) |
|---|---|
| 70.3 Grams | PM Acetate Solvent (Dow Chemical Company) |

This mixture was set aside and labeled Component C.

The above components was allowed to sit overnight for equilibration and were then combined by adding Component A to Component B under high speed mixing, then after 5 minutes Component C was added and mixed for an additional 5 minutes. The above mixed components were allowed to sit for 30 minutes to release any entrained air and were then drawn down with a 5 mil drawdown bar on steel panels for testing (Q Panel Corporation). 4"·4" Taber abraser panels were also coated with a paint brush for the testing of abrasion resistance. The coated panels were allowed to cure for 7 days at room temperature and were then tested for several properties. The results obtained by this example are shown in the following table:

| Test | Result | ASTM Reference |
| --- | --- | --- |
| Gloss (60° Specular) | 99 | D 523 |
| Pencil Hardness | 7H | D 3363 |
| Direct Impact Resistance | >160 in · lbs | G 14-88 |
| Indirect Impact Resistance | >160 in · lbs | G 14-88 |
| Abrasion Resistance (24 hour covered spot test) | 42 milligrams loss | D 4060 |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | 8 D Blisters | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the chemical resistance of the example was improved significantly by substitution of 20% Epoxy solids for 20% of the Urethane solids in Example 2 with no other sacrifice of properties in either flexibility or abrasion resistance.

Example 6

The same technique used to prepared Example 4 was used but instead of Beckopox EP 384w/53% a substitution of Beckopox EP 385w was made. The components of this formulation were also mixed according to the method use in Example 4 and the films were cast in the same manner. The data for this example is as follows:

| Test | Result | ASTM Reference |
| --- | --- | --- |
| Gloss (60° Specular) | 90 | D 523 |
| Pencil Hardness | 8H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 56 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | Slight Softening | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the Beckopox EP 385 performed comparable to the Beckopox EP 384w used in Example 4, but hardness is better.

Example 7

The same technique used to prepare Example 4 was used but instead of Beckopox EP 384w/53% a substitution of Beckopox VEM 2132w was made. The components of this formulation were also mixed according to the method used in Example 4 and the films were cast in the same manner. The data for this example is as follows:

| Test | Result | ASTM Reference |
| --- | --- | --- |
| Gloss (60° Specular) | 92 | D 523 |
| Pencil Hardness | 8H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 40 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | No Effect | D 1308-87 |
| Saturated Sugar Solution | No Effect | D 1308-87 |
| Saturated Salt Solution | No Effect | D 1308-87 |
| Methanol | No Effect | D 1308-87 |
| Butanol | Slight Softening | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the Beckopox VEM 2132 performed comparable to the Beckopox EP 384w used in Example 4.

Example 8

The same technique used to prepare Example 4 was used but instead of Beckopox EP 384w/53% a substitution of Beckopox VEM 2137w was made. The components of this formulation were also mixed according to the method used in Example 4 and the films were cast in the same manner. The data for this example is as follows:

| Test | Result | ASTM Referenee |
| --- | --- | --- |
| Gloss (60° Specular) | 102 | D 523 |
| pencil Hardness | 8H | D 3363 |
| Direct Impact Resistance | >160 in · lbs | G 14-88 |
| Indirect Impact Resistance | >160 in · lbs | G 14-88 |

| Test | Result | ASTM Reference |
|---|---|---|
| Abrasion Resistance (CS-17 Disk, 1000 gms, 1000 cycles) | 60 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | No Effect | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the Beckopox VEM 2137 performed comparable to the Beckopox EP 384w used in Example 4.

Example 9

The same technique used to prepare Example 5 was used but instead of Beckopox EP 384w/53% a substitution of Beckopox EP 385w was made. The components of this formulation were also mixed according to the method used in Example 5 and the films were cast in the same manner.

| Test | Result | ASTM Reference |
|---|---|---|
| Gloss (60° Specular) | 93 | D 523 |
| pencil Hardness | 7H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 58 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | Slight Softening | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the Beckopox EP 385 performed comparable to the Beckopox EP 384w used in Example 5.

Example 10

The same technique used to prepare Example 5 was used but instead of Beckopox EP 384w/53% a substitution of Beckopox VEM 2132w was made. The components of this formulation were also mixed according to the method used in Example 5 and the films were cast in the same manner. The data for this example is as follows:

| Test | Result | ASTM Reference |
|---|---|---|
| Gloss (60° Specular) | 93 | D 523 |
| pencil Hardness | 7H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 48 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | No Effect | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the Beckopox VEM 2132 performed comparable to the Beckopox EP 384w used in Example 5.

Example 11.

The same technique used to prepare Example 5 was employed here, but instead of Beckopox EP 3 84w/53 % a substitution of Beckopox VEM 2137w was made. The components of this formulation were also mixed according to the method use in Example 5 and the films were cast in the same manner. The data for this example is as follows:

| Test | Result | ASTM Reference |
|---|---|---|
| Gloss (60° Specular) | 90 | D 523 |
| Pencil Hardness | 7H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 56 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | No Effect | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the Beckopox VEM 2137 performed comparable to the Beckopox EP 384w used in Example 5.

Example 12

This example was to again demonstrate how the partial substitution (20%) of phenoxy resin (Ultra high molecular weight aromatic ether with no active epoxy groups left) for some of the urethane component increased the chemical resistance of the formulation.

To a 1 liter vessel the following was added under gentle stirring.

| | |
|---|---|
| 377.19 grams | Daotan VTW 1225 |
| 56.6 grams | Water |
| 34.7 grams | PM Acetate Solvent (Dow Chemical Company) |
| 111.3 grams | PKHW-34 (Phenoxy Associates) |

This mixture was set aside and labeled Component A.

To another 1 liter agitated vessel the following was added:

| | |
|---|---|
| 237.4 grams | Desmondur N-3300 (Aliphatic polyisocyanate, Bayer Chemical Co.) |
| 70.3 grams | PM Acetate Solvent (Dow Chemical Company) |

This mixture was set aside and labeled Component B.

The above components were allowed to sit overnight for equilibration and were then combined by adding Component A to Component B under high speed mixing. The above mixed components were allowed to sit for 30 minutes to release any entrained air and were then drawn down with a 5 mil drawdown bar on steel panels for testing (Q Panel Corporation). 4"·4" Taber abraser panels were also coated with a paint brush for the testing of abrasion resistance. The coated panels were allowed to cure for 7 days at room temperature and were then tested for several properties. The results obtained by this example are shown in the following table:

| Test | Result | ASTM Reference |
|---|---|---|
| Gloss (60° Specular) | 98 | D 523 |
| Pencil Hardness | 5H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 10 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | 8 F Blisters | D 1308-87 |
| Saturated Sugar Solution | No Effect | D 1308-87 |
| Saturated Salt Solution | No Effect | D 1308-87 |
| Methanol | No Effect | D 1308-87 |
| Butanol | slight softening | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the chemical resistance of the example was improved significantly by substitution of 20% Phenoxy solids for 20% of the Urethane solids in Example 1 with no other sacrifice of properties. In fact this example demonstrates the advantage of increased abrasion resistance due to the molecular weight of the phenoxy resin. This example also demonstrates that no active epoxy groups need to be present for the system to perform as designed.

Example 13

This example was to demonstrate how the level of aliphatic polyisocyanate effects the performance of the coating.

To a 1 liter vessel the following was added under gentle stirring.

| | |
|---|---|
| 377.19 grams | Daotan VTW 1225 |
| 96.49 grams | Water |
| 34.7 grams | PM Acetate Solvent (Dow Chemical Company) |

This mixture was set aside and labeled Component A.

A 71.37 gram sample of Beckopox EP 384w/53% epoxy dispersion was put in a separate container and labeled as Component B.

To another 1 liter agitated vessel the following was added:

| | |
|---|---|
| 189.7 grams | Desmondur N-3300 (Aliphatic polyisocyanate, Bayer Chemical Co.) |
| 109.3 grams | PM Acetate Solvent (Dow Chemical Company) |

This mixture was set aside and labeled Component C.

The above components were allowed to sit overnight for equilibration and were then combined by adding Component A to Component B under high speed mixing, then after 5 minutes Component C was added and mixed for an additional 5 minutes. The above mixed components were allowed to sit for 30 minutes to release any entrained air and were then drawn down with a 5 mil drawdown bar on steel panels for testing (Q Panel Corporation). 4"·4" Taber abraser panels are also coated with a paint brush for the testing of abrasion resistance. The coated panels were allowed to cure for 7 days at room temperature and were then tested for several properties. The results obtained by this example are shown in the following table:

| Test | Result | ASTM Reference |
|---|---|---|
| Gloss (60° Specular) | 102 | D 523 |
| Pencil Hardness | 6H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 32 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | No Effect | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |

-continued

| Test | Result | ASTM Reference |
|------|--------|----------------|
| Xylene | No Effect | D 1308-87 |
| Motor Oil | No Effect | D 1308-87 |
| Clorox | No Effect | D 1308-87 |

As can be seen from the data the reduction in the polyisocyanate had little effect on the coatings performance.

Example 14

This example was to demonstrate how the level of aliphatic polyisocyanate effects the performance of the coating.

To a 1 liter vessel the following was added under gentle stirring.

| | |
|---|---|
| 377.19 grams | Daotan VTW 1225 |
| 96.49 grams | Water |
| 34.7 grams | PM Acetate Solvent (Dow Chemical Company) |

This mixture was set aside and labeled Component A.

A 71.37 gram sample of Beckopox EP 384w/53% epoxy dispersion was put in a parate container and labeled as Component B.

To another 1 liter agitated vessel the following was added:

| | |
|---|---|
| 142.3 grams | Desmondur N-3300 (Aliphatic polyisocyanate, Bayer Chemical Co.) |
| 148.6 grams | PM Acetate Solvent (Dow Chemical Company) |

This mixture was set aside and labeled Component C.

The above components were allowed to sit overnight for equilibration and were then combined by adding Component A to Component B under high speed mixing, then after 5 minutes Component C was added and mixed for an additional 5 minutes. The above mixed components were allowed to sit for 30 minutes to release any entrained air and are then drawn down with a 5 mil drawdown bar on steel panels for testing (Q Panel Corporation). 4"·4" Taber abraser panels were also coated with a paint brush for the testing of abrasion resistance. The coated panels were allowed to cure for 7 days at room temperature were then tested for several properties. The results obtained by this example are shown in the following table:

| Test | Result | ASTM Reference |
|------|--------|----------------|
| Gloss (60° Specular) | 102 | D 523 |
| Pencil Hardness | 6H | D 3363 |
| Direct Impact Resistance | >160 in · lbs | G 14-88 |
| Indirect Impact Resistance | >160 in · lbs | G 14-88 |
| Abrasion Resistance (CS-17 Disk, 1000 gms, 1000 cycles) | 20 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |

-continued

| Test | Result | ASTM Reference |
|------|--------|----------------|
| 10% Sulfuric Acid | No Effect | D 1308-87 |
| 10% Ammonia | No Effect | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the reduction in the polyisocyanate had little effect on the coatings performance.

Example 15

This example was to demonstrate how the level of aliphatic polyisocyanate effects the performance of the coating.

To a 1 liter vessel the following was added under gentle stirring.

| | |
|---|---|
| 377.19 grams | Daotan VTW 1225 |
| 96.49 grams | Water |
| 34.7 grams | PM Acetate Solvent (Dow Chemical Company) |

This mixture was set aside and labeled Component A.

A 71.37 gram sample of Beckopox EP 384w/53% epoxy dispersion was put in a separate container and labeled as Component B.

To another 1 liter agitated vessel the following was added:

| | |
|---|---|
| 94.9 grams | Desmondur N-3300 (Aliphatic polyisocyanate, Bayer Chemical Co.) |
| 187.9 grams | PM Acetate Solvent (Dow Chemical Company) |

This mixture was set aside and labeled Component C.

The above components were allowed to sit overnight for equilibration and were then combined by adding Component A to Component B under high speed mixing, then after 5 minutes Component C was added and mixed for an additional 5 minutes. The above mixed components were allowed to sit for 30 minutes to release any entrained air and were then drawn down with a 5 mil drawdown bar on steel panels for testing (Q Panel Corporation). 4"·4" Taber abraser panels were also coated with a paint brush for the testing of abrasion resistance. The coated panels were allowed to cure for 7 days at room temperature and were then tested for several properties. The results obtained by this example are shown in the following table:

| Test | Result | ASTM Reference |
|------|--------|----------------|
| Gloss (60° Specular) | 102 | D 523 |
| Pencil Hardness | 6H | D 3363 |
| Direct Impact Resistance | >160 in · lbs | G 14-88 |

-continued

| Test | Result | ASTM Reference |
|---|---|---|
| Indirect Impact Resistance | >160 in · lbs | G 14-88 |
| Abrasion Resistance (CS-17 Disk, 1000 gms, 1000 cycles) | 62 milligrams loss | D 4060 |
| Chemical Resistance (24 hour covered spot test) | | |
| 10% Hydrochloric Acid | No Effect | D 1308-87 |
| 25% Nitric Acid | Film Destroyed | D 1308-87 |
| 10% Sulfuric Acid | No Effect | D 1308-87 |
| 10% Ammonia | No Effect | D 1308-87 |
| Saturated Sugar Solution | No Effect | D 1308-87 |
| Saturated Salt Solution | No Effect | D 1308-87 |
| Methanol | No Effect | D 1308-87 |
| Butanol | No Effect | D 1308-87 |
| Mineral Spirits | No Effect | D 1308-87 |
| Gasoline | No Effect | D 1308-87 |
| Xylene | No Effect | D 1308-87 |
| Motor Oil | No Effect | D 1308-87 |
| Clorox | No Effect | D 1308-87 |

As can be seen from the data the reduction in the polyisocyanate had little effect on the coatings performance.

What is claimed:

1. An aqueous polyurethane coating composition comprising:
   i) a hydroxyl group containing polyurethane, dispersed in water, obtainable by two-step reaction of
      a polyisocyanate A having at least two isocyanate groups,
      a polyol B having a $M_n$ of at least 400 g/mol, selected from the group consisting of polyester polyols, polyether polyols, polyurethane polyols, and polyacrylate polyols, with a hydroxyl number of from 30 to 280 mg/g,
      a compound C that has at least one group capable of forming anions, and at least two groups that are reactive towards isocyanate groups, and optionally,
      a low molar mass polyol D with $M_n$ of from 60 to 400 g/mol to form an isocyanate-terminated intermediate, which is then reacted with at least one of
      a low molar mass polyol E carrying no other isocyanate-reactive group,
      a compound F which is either monofunctional towards NCO or contains active hydrogen of different reactivity,
      a compound G selected from the group consisting of water, hydrazine and aliphatic diprimary amines like ethylene diamine, diamino propane and diamino hexane, with an OH number of from 30 to 200 mg/g and $M_n$ of from 1600 to 50000 g/mol dispersed in water,
   ii) a crosslinker selected from the group consisting of uncapped aliphatic and aromatic polyisocyanate compounds; and
   iii) an aromatic polyether, selected from the group consisting of epoxy resins, phenoxy resins and mixtures thereof.

2. The coating composition of claim 1, wherein said coating composition also includes water and a water miscible solvent.

3. The coating composition of claim 2, wherein said coating has a mass fraction of solids of from 2 to 80%.

4. The coating composition of claim 2, wherein said water miscible solvent is selected from the class of esters, ketones, glycol ethers, glycol ether acetates or mixtures of two or more of these.

5. The coating composition of claim 1, wherein said aromatic polyethers have a molar mass of from 200 to about 40,000 g/mol.

6. The coating composition of claim 1, wherein the mass of said polyisocyanate ii) is 50 to 200% of the mass of the polyurethane solids.

7. The coating composition of claim 1, wherein the mass of said aromatic polyether is 1 to 50% of the mass of the polyurethane solids.

8. The coating composition of claim 1, wherein said polyurethane i) has a hydroxyl number from 20 to about 100 mg/g.

9. A polyurethane ambient temperature cured coating which comprises the dried residue of a uniformly mixed and reacted composition comprising:
   i) a hydroxyl functional aliphatic polyurethane,
   ii) an aliphatic or aromatic polyisocyanate;
   iii) an aromatic polyether.

10. A three component polyurethane coating composition comprising:
   a) a hydroxyl group containing polyurethane, dispersed in water, obtainable by two-step reaction of
      a polyisocyanate A having at least two isocyanate groups,
      a polyol B having a $M_n$ of at least 400 g/mol, selected from the group consisting of polyester polyols, polyether polyols, polyurethane polyols, and polyacrylate polyols, with a hydroxyl number of from 30 to 280 mg/g,
      a compound C that has at least one group capable of forming anions, and at least two groups that are reactive towards isocyanate groups, and optionally,
      a low molar mass polyol D with $M_n$ of from 60 to 400 g/mol to form an isocyanate-terminated intermediate, which is then reacted with at least one of
      a low molar mass polyol E carrying no other isocyanate-reactive group,
      a compound F which is either monofunctional towards NCO or contains active hydrogen of different reactivity,
      a compound G selected from the group consisting of water, hydrazine and aliphatic diprimary amines like ethylene diamine, diamino propane and diamino hexane, with an OH number of from 30 to 200 mg/g and $M_n$ of from 1600 to 50000 g/mol dispersed in water,
   b) an aqueous epoxy resin dispersion; and
   c) an aliphatic polyisocyanate which is uniformly mixed immediately before application.

11. The coating composition of claim 10, wherein the mass of said epoxy resin is 1 to 50% of the mass of polyurethane solids of component (a); and the mass of said polyisocyanate is 50 to 200% of the mass of polyurethane solids in component (a).

12. A two component polyurethane coating composition comprising:
   a) a hydroxyl group containing polyurethane, dispersed in water, obtainable by two-step reaction of
      a polyisocyanate A having at least two isocyanate groups,
      a polyol B having a $M_n$ of at least 400 g/mol, selected from the group consisting of polyester polyols, polyether polyols, polyurethane polyols, and polyacrylate polyols, with a hydroxyl number of from 30 to 280 mg/g, a compound C that has at least one group capable of forming anions, and at least two groups that are reactive towards isocyanate groups, and optionally, a low molar mass polyol D with $M_n$ of from 60 to 400 g/mol to form an isocyanate-terminated intermediate, which is then reacted with at least one of a low molar mass polyol E carrying no other isocyanate-reactive group, a compound F which is either monofunctional towards NCO or contains active hydrogen of different reactivity, a compound G selected from the group consisting of water, hydrazine and aliphatic diprimary amines like ethylene diamine, diamino propane and diamino hexane, with an OH number of from 30 to 200 mg/g and $M_n$ of from 1600 to 50000 g/mol dispersed in water, and a phenoxy resin; and b) an aliphatic polyisocyanate, which is uniformly mixed immediately before application.

13. The coating composition of claim 12, wherein the mass of said phenoxy resin is 1 to 50% of the mass of polyurethane solids, and the mass of said polyisocyanate is 50 to 200% of the mass of polyurethane solids.

14. A two component polyurethane coating composition which can be cured at ambient temperature, comprising:

a) a hydroxyl group containing polyurethane, dispersed in water, obtainable by two-step reaction of a polyisocyanate A having at least two isocyanate groups, a polyol B having a $M_n$ of at least 400 g/mol, selected from the group consisting of polyester polyols, polyether polyols, polyurethane polyols, and polyacrylate polyols, with a hydroxyl number of from 30 to 280 mg/g, a compound C that has at least one group capable of forming anions, and at least two groups that are reactive towards isocyanate groups, and optionally, a low molar mass polyol D with $M_n$ of from 60 to 400 g/mol to form an isocyanate-terminated intermediate, which is then reacted with at least one of a low molar mass polyol E carrying no other isocyanate-reactive group, a compound F which is either monofunctional towards NCO or contains active hydrogen of different reactivity, a compound G selected from the group consisting of water, hydrazine and aliphatic diprimary amines, with an OH number of from 30 to 200 mg/g and $M_n$ of from 1600 to 50,000 g/mol dispersed in water, and a phenoxy resin; and b) an aliphatic uncapped polyisocyanate, which is uniformly mixed immediately before application.

15. A three component polyurethane coating composition which can be cured at ambient temperature, comprising:

a) a hydroxyl group containing polyurethane, dispersed in water, obtainable by two-step reaction of a polyisocyariate A having at least two isocyanate groups, a polyol B having a $M_n$ of at least 400 g/mol, selected from the group consisting of polyester polyols, polyether polyols, polyurethane polyols, and polyacrylate polyols, with a hydroxyl number of from 30 to 280 mg/g, a compound C that has at least one group capable of forming anions, and at least two groups that are reactive towards isocyanate groups, and optionally, a low molar mass polyol D with $M_n$ of from 60 to 400 g/mol to form an isocyanate-terminated intermediate, which is then reacted with at least one of a low molar mass polyol E carrying no other isocyanate-reactive group, a compound F which is either monofunctional towards NCO or contains active hydrogen of different reactivity, a compound G selected from the group consisting of water, hydrazine and aliphatic diprimary amines, with an OH number of from 30 to 200 mg/g and $M_n$ of from 1600 to 50,000 g/mol dispersed in water, b) an aqueous epoxy resin dispersion; and c) an aliphatic uncapped polyisocyanate, which is uniformly mixed immediately before application.

16. An aqueous polyurethane coating composition comprising:

i) a hydroxyl group containing polyurethane, dispersed in water, obtainable by two-step reaction of a polyisocyanate A having at least two isocyanate groups, a polyol B having a $M_n$ of at least 400 g/mol, selected from the group consisting of polyester polyols, polyether polyols, polyurethane polyols, and polyacrylate polyols, with a hydroxyl number of from 30 to 280 mg/g, a compound C that has at least one group capable of forming anions, and at least two groups that are reactive towards isocyanate groups, and optionally, a low molar mass polyol D with $M_n$ of from 60 to 400 g/mol to form an isocyanate-terminated intermediate, which is then reacted with at least one of a low molar mass polyol E carrying no other isocyanate-reactive group, a compound F which is either monofunctional towards NCO or contains active hydrogen of different reactivity, a compound G selected from the group consisting of water, hydrazine and aliphatic diprimary amines, with an OH number of from 30 to 200 mg/g and $M_n$ of from 1600 to 50,000 g/mol dispersed in water, ii) a crosslinker which is ethylene diisocyanate, 1,4-tetramethylene diisocyanate, 1,6-hexamethylene diisocyanate, 2,4,4-trimethyl-1,6-hexamethylene diisocyanate, 1,12-dodecane diisocyanate, cyclobutane-1,3-diisocyanate, cyclohexane-1,3- and/or -1,4-diisocyanate, 1-isocyanato-2-isocyanatomethyl cycolpentane, 1-isocyanato-3,3,5-trimethyl-5-isocyanatomethyl cyclohexane (isophorone diisocyanate or IPDI), 2,4- and 2,6-hexahydrotoluylene diisocyanate, 2,4'- and/or 4,4''-dicyclohexytmethane diisocyanate $\alpha,\alpha,\alpha',\alpha$-tetramethyl-1,3- and/or -1,4-xylylene diisocyanate, 1,3- and 1,4-xylylenediisocyanate, 1-isocyanate-1-methyl-4(3)-isocyanatomethyl-cyclohexane, 1,3- and 1,4-phenylene diisocyanate, 2,4- and 2,6-totuylene diisocyanate, diphenyl methane-2,4'- and 4,4'-diisocyanate, naphthalene-1,5-diisocyanate, triphenyl methane-4,4,4''-triisocyanate, polyphenyl polymethylene polyisocyanates of the type obtained by condensing aniline with formaldehyde following phosgenation, mixtures of these, their dimers (uretdiones), trimers (isocyanurates), or reaction products thereof with glycols, polyols, amines or phenols; and iii) an aromatic polyether, selected from the group consisting of epoxy resins, phenoxy resins and mixtures thereof.

17. A method of coating a substrate comprising applying the coating composition of claim 1 and curing the same at ambient temperature.

18. A method of coating a substrate comprising applying the coating composition of claim 10 and curing the same at ambient temperature.

19. A method of coating a substrate comprising applying the coating composition of claim 12 and curing the same at ambient temperature.

20. A method of coating a substrate comprising applying the coating composition of claim 14 and curing the same at ambient temperature.

21. A method of coating s substrate comprising applying the coating composition of claim 15 and curing the same at ambient temperature.

* * * * *